United States Patent

Craig et al.

(10) Patent No.: US 6,746,174 B2
(45) Date of Patent: Jun. 8, 2004

(54) METHOD AND APPARATUS FOR ATTACHING MOULDED ENCLOSURES

(75) Inventors: Peter Mathieson Craig, Kanata (CA); Julia Turner, Woodlawn (CA)

(73) Assignee: Mitel Knowledge Corporation (CA)

( * ) Notice: Subject to any disclaimer, the term of this patent is extended or adjusted under 35 U.S.C. 154(b) by 0 days.

(21) Appl. No.: 09/907,847

(22) Filed: Jul. 18, 2001

(65) Prior Publication Data

US 2002/0028107 A1 Mar. 7, 2002

(30) Foreign Application Priority Data

Jul. 19, 2000 (GB) .............................. 0017730

(51) Int. Cl.⁷ .............................................. F16B 13/06
(52) U.S. Cl. ........................ 403/368; 403/365; 411/60.2
(58) Field of Search ........................ 411/60.2, 55, 57.1, 411/15; 403/280, 365, 366, 367, 368, 369, 370, 371

(56) References Cited

U.S. PATENT DOCUMENTS

| | | | | |
|---|---|---|---|---|
| 4,246,668 A | * | 1/1981 | Spillmann et al. | 411/55 X |
| 4,263,833 A | * | 4/1981 | Loudin et al. | 411/55 X |
| 5,098,237 A | | 3/1992 | Harker | |
| 5,540,528 A | * | 7/1996 | Schmidt et al. | 411/55 X |
| 6,276,882 B1 | * | 8/2001 | Young | 411/55 X |

FOREIGN PATENT DOCUMENTS

| | | |
|---|---|---|
| GB | 764637 | 12/1956 |
| GB | 2 005 372 A | 4/1979 |
| GB | 2 274 698 A | 8/1994 |
| WO | WO 99/10658 | 3/1999 |

\* cited by examiner

*Primary Examiner*—John R. Cottingham
(74) *Attorney, Agent, or Firm*—Fay, Sharpe, Fagan, Minnich & McKee, LLP

(57) ABSTRACT

An adjunct part can be secured to a host part, where the host part defines a recess configured to allow a threaded fastener to secure the host part to a further part. The adjunct part has a resilient boss projecting therefrom and adapted to enter the recess, the boss having an axially extending opening to receive a threaded tightening member. The boss and the threaded tightening member have configurations which allow the tightening member, as it advances into the boss along the opening, to resiliently urge portions of the boss radially outward into binding contact with the interior of the recess, thereby fastening the adjunct part to the host part.

9 Claims, 2 Drawing Sheets

METHOD AND APPARATUS FOR ATTACHING MOULDED ENCLOSURES

This invention has to do generally with moulded enclosures of the kind widely used for industrial or home devices, such as telephones, radios, etc.

BACKGROUND OF THIS INVENTION

It would be of advantage to be able to attach an adjunct enclosure to an existing set which lacked any pre-designed features to allow attachment. In the past, additional hardware would have to be provided to co-locate the two parts, thus adding to the cost and complexity of the installation.

GENERAL DESCRIPTION OF THIS INVENTION

The main feature of this invention allows an adjunct enclosure to be attached to a host enclosure utilizing a common detail on the host enclosure, that detail being the recessed screw hole employed to hide the screws that hold the host enclosure together. This can be accomplished without requiring any change to the host enclosure or disassembly of the screws on the host enclosure.

More particularly, this invention provides, to facilitate the attachment of an adjunct part to a host part, in which the host part exhibits a recess with an internal surface:

the combination, with the adjunct part, of a resilient boss projecting from the adjunct part and adapted to enter said recess, the boss having an axially extending opening to receive a threaded tightening member, the boss and the threaded tightening member further having configurations which allow said tightening member, as it advances into the boss along said opening, to resiliently urge portions of said boss radially outward into binding contact with the internal surface of the recess, thereby fastening the adjunct part to the host part.

Further, this invention provides a method of attaching an adjunct part to a host part, in which the host part exhibits a recess with an internal surface, the adjunct part having a resilient boss projecting from the adjunct part and adapted to enter said recess, the boss having an axially extending opening to receive a threaded tightening member, the boss and the threaded tightening member further having configurations which allow said tightening member, as it advances into the boss along said opening, to resiliently urge portions of said boss radially outward, the method including the steps:
 a) inserting the boss into the recess, and
 b) screwing said threaded tightening member into said opening, so that as the tightening member advances into the boss along said opening, said portions of the boss are urged radially outward into binding contact with the internal surface of the recess, thereby fastening the adjunct part to the host part.

Finally, this invention provides, in combination, a host part exhibiting a recess with an internal surface, an adjunct part having a resilient boss projecting from the adjunct part and received within said recess, the boss having an axially extending opening in which is screwed a threaded tightening member, the boss and the threaded tightening member having configurations such that said tightening member, screwed fully into said opening, resiliently urges portions of said boss radially outward into binding contact with the internal surface of said recess, thereby fastening the adjunct part to the host part.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 6:
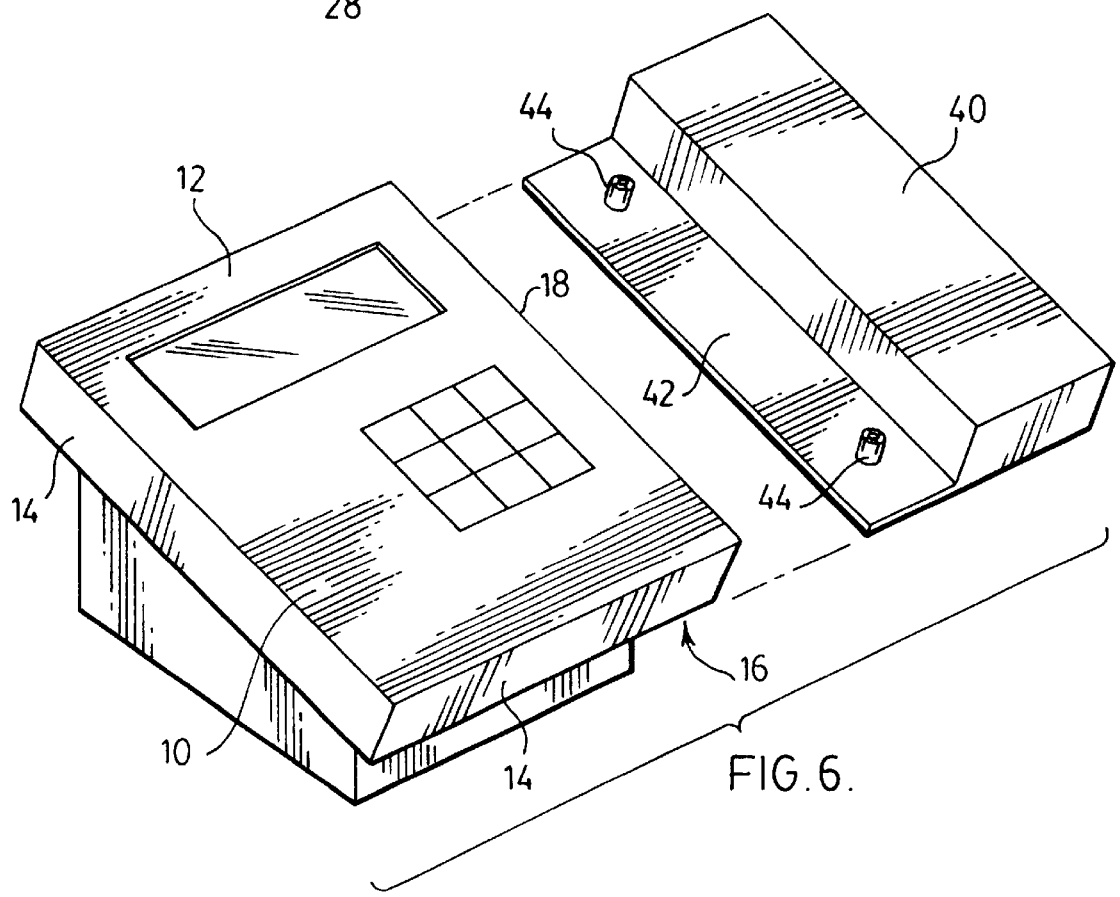
FIG. 6 shows, in perspective, a host enclosure and an adjunct enclosure, illustrating suitable locations for two bosses.

Attention is first directed to FIG. 6, which is a perspective view of a main or "host" enclosure 10, having an outer surface 12, side walls 14 (only two of four visible) and an undercut surface located where indicated by the arrow 16. In the embodiment illustrated, the undercut surface 16 is substantially flat and extends the full length of the far edge 18 as seen in FIG. 6.

Figure 5:
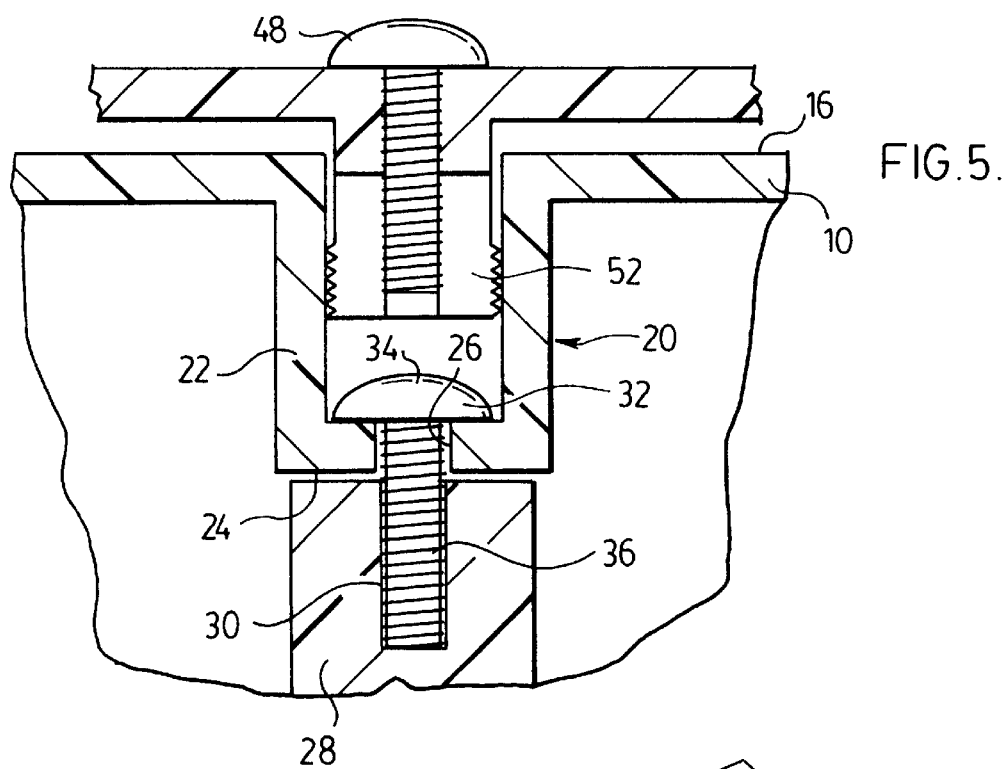
FIG. 5 is an axial sectional view through the boss of FIG. 1, and also shows the host enclosure with a recess receiving the boss, along with a threaded tightening member fully inserted into the boss.

Attention is now directed to FIG. 5, which shows an inverted view of a portion of the undercut surface 16, having a substantially cylindrical recess 20 consisting of a cylindrical side wall 22 integral with the host enclosure 10, and a bottom wall 24 with a central aperture 26.

FIG. 5 also illustrates a portion of a post 28 which is an integral part of another portion of the host enclosure 10, to which the portion identified by the numeral 16 is to be attached. As FIG. 5 makes clear, the post 28 has a central bore 30 adapted to receive a threaded fastener 32 with a rounded head 34 and a threaded shank 36. The fastener 32, when tightened, maintains the relative positions of the post 28 and the recess 20.

As already mentioned, FIG. 5 is inverted with respect to FIG. 6. In FIG. 6, the recess 20 extends upwardly from the undercut surface 16.

FIG. 6 illustrates an adjunct enclosure 40 having a marginal flange 42 which is adapted to be secured against the undercut surface 16 of the host enclosure 10. In the embodiment illustrated in FIG. 6, it is assumed that the undercut surface 16 exhibits two recesses of the kind shown at 20 in FIG. 5, such recesses being spaced apart to match the spacing of two upwardly extending bosses 44 on the flange 42.

Attention is now directed to FIGS. 1–4, which illustrate the structure and function of each boss 44.

In FIGS. 1 through 4, the boss 44 is shown to be integral with the flange 42. It is also illustrated as having a central opening 46 into which a threaded tightening member 48 is adapted to be screwed.

In general terms, the present invention may be seen to reside in the configurations of the boss 44 and the tightening member 48, these being such that, as the tightening member 48 advances into the boss 44 along the opening 46, it resiliently urges portions of the boss 44 radially outward into binding contact with the internal surface of the recess 20, thereby fastening the flange 42 to the host enclosure 10 at the location of the undercut surface 16.

In the specific embodiment illustrated, a portion of the boss 44 which is remote from the adjunct part (flange) 42 from which it extends, is divided by a plurality of radially and axially extending slots 50 into a plurality of fingers 52. Each finger 52 has a thicker portion remote from the adjunct part (flange) 42 and a thinner portion adjacent the adjunct part.

Even more specifically, the thinner and thicker portions just mentioned are created by configuring the opening 46 such that it includes a substantially cylindrical portion 54 adjacent the adjunct part 42 and a substantially conical portion 56 remote from the adjunct part 42.

Figure 1:
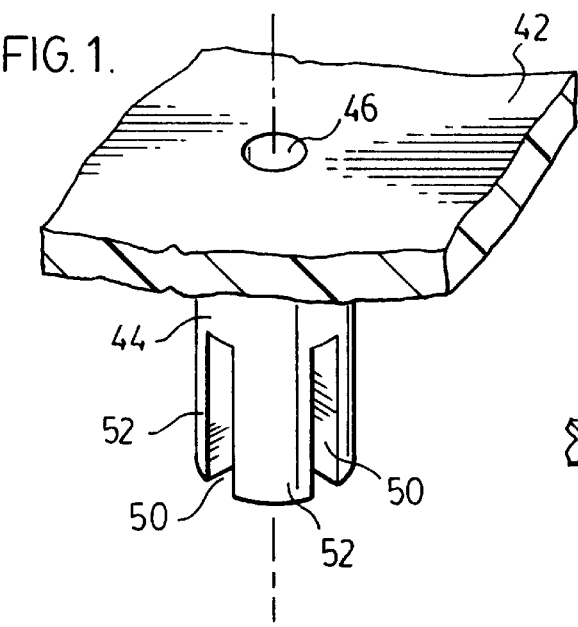
FIG. 1 is a perspective view of a boss secured to an adjunct enclosure.
Figure 2:
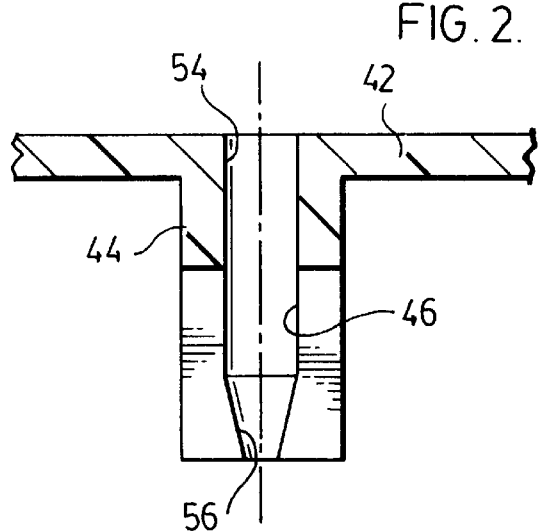
FIG. 2 is an axial sectional view through the boss of FIG. 1.
Figure 3:
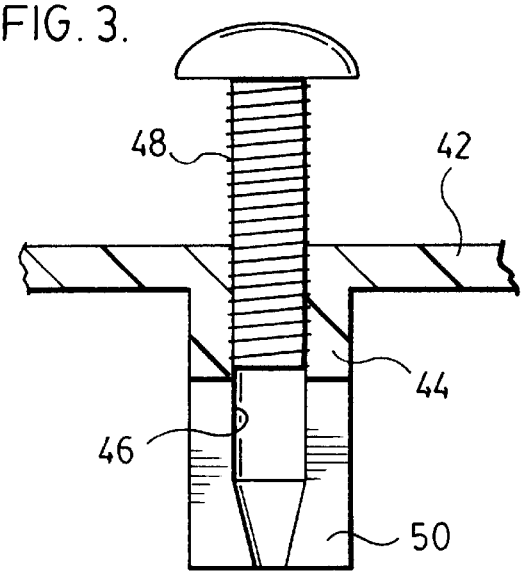
FIG. 3 is an axial sectional view through the boss of FIG. 1, showing the initial threaded insertion of a threaded tightening member.
Figure 4:
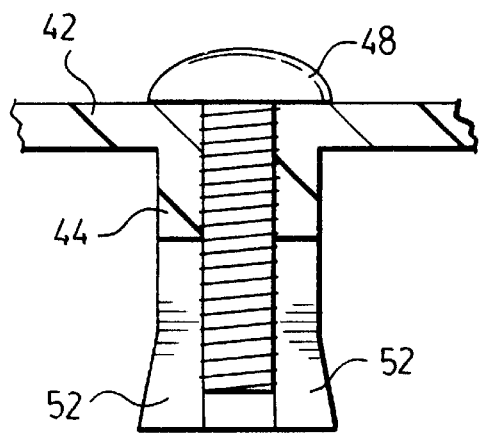
FIG. 4 is an axial sectional view of the boss of FIG. 1, showing the tightening member fully inserted into the boss.

FIG. 3 shows the tightening member 48 partly advanced along the opening 46, but still within the cylindrical portion 54 thereof. FIG. 4, however, shows the tightening member 48 fully inserted into the opening 46, so that the leading end of the tightening member encounters the conical portion 56 of the opening 46. In this situation, the mechanical interference between the tightening member 48 and the fingers 52 urges the fingers 52 outwardly into binding contact with the internal surface of the recess 20 (into which the boss 44 was initially inserted).

The structure described above leads to a novel method of attaching an adjunct part to a host part, where the host part exhibits a recess with an internal surface and a bottom wall defining an aperture through which the shaft of a threaded fastener 32 (see FIG. 5) can pass to secure the host part to a further part (the post 28 seen in FIG. 5), the adjunct part having a resilient boss projecting from the adjunct part and adapted to enter the recess, the boss having an axially extending opening to receive a threaded tightening member, the boss and the threaded tightening member further having configurations which allow the tightening member, as it advances into the boss along the opening, to resiliently urge portions of the boss radially outward. The method involves a first step of inserting the boss into the recess, and a second step of screwing the threaded tightening member into the opening (46), so that as the tightening member advances into the boss along the opening, portions of the boss will be urged radially outward into binding contact with the interior of the recess, thereby fastening the adjunct part to the host part.

It is to be noted that, although the boss projecting from the adjunct part is castellated in configuration, the same features could be provided on a connecting plate, such that two host-type enclosures are held together by screwing into both of them.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. To facilitate the attachment of a moulded adjunct enclosure to a host enclosure, in which the host enclosure exhibits a recess wherein said entire recess has a cylindrical internal surface formed by side walls and a bottom wall:

the combination, with the adjunct enclosure, of a resilient boss integral to and of unitary construction with said adjunct enclosure, said boss projecting from the adjunct enclosure and adapted to enter said recess and be captured between said side walls and said bottom wall of said recess, the boss having an axially extending opening to receive a threaded tightening member, the boss and the threaded tightening member, further having configurations which allow said tightening member, as it advances into the boss along said opening, to resiliently urge portions of said boss radially outward into binding contact with the side walls of the recess, thereby fastening the adjunct enclosure to the host enclosure.

2. The combination claimed in claim 1, in which a portion of the boss remote from the adjunct enclosure is divided by a plurality of radially and axially extending slots into a plurality of fingers, each finger having a thicker portion remote from the adjunct enclosure and a thinner portion adjacent the adjunct enclosure.

3. The combination claimed in claim 2, in which the opening has a substantially cylindrical portion adjacent the adjunct enclosure and a substantially conical portion remote from the adjunct enclosure, and in which said recess bottom wall has an aperture through which the shaft of a threaded fastener can pass to secure the host enclosure to a further part.

4. In combination, a first host part exhibiting a recess formed by walls extending below a top surface of said host part, said entire recess having a cylindrical internal surface, said host part further comprises an aperture through a bottom wall of said recess;

a second adjunct part having a resilient boss integral with and of unitary construction with said adjunct part, projecting from the adjunct part and extending within said recess and not protruding beyond said recess, the boss having an axially extending opening in which is screwed a threaded tightening member, the boss and the threaded tightening member having configurations which that said tightening member, screwed fully into said opening, resiliently urges portions of said boss radially outward into binding contact with the internal surface of the recess, thereby fastening the adjunct part to the host part; and, a third part secured to said host part by a fastening member extending through said aperture of said recess bottom wall.

5. The combination claimed in claim 4, in which a portion of the boss remote from the adjunct part is divided by a plurality of radially and axially extending slots into a plurality of fingers, each finger having a thicker portion remote from the adjunct part and a thinner portion adjacent the adjunct part.

6. The combination claimed in claim 5, in which the opening has a substantially cylindrical portion adjacent the adjunct part and a substantially conical portion remote from the adjunct part.

7. The combination claimed in claim 4, wherein said third part comprises a post.

8. The combination claimed in claim 1, wherein said resilient boss does not extend beyond said bottom wall of said recess.

9. The combination claimed in claim 4, wherein said resilient boss does not extend beyond said bottom wall of said recess.

* * * * *